United States Patent
Ezell

(10) Patent No.: US 8,887,809 B2
(45) Date of Patent: Nov. 18, 2014

(54) TREATMENT FLUIDS COMPRISING TRANSIENT POLYMER NETWORKS

(75) Inventor: Ryan G. Ezell, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 24 days.

(21) Appl. No.: 12/551,334

(22) Filed: Aug. 31, 2009

(65) Prior Publication Data

US 2011/0048716 A1 Mar. 3, 2011

(51) Int. Cl.
| | |
|---|---|
| *E21B 43/22* | (2006.01) |
| *C09K 8/508* | (2006.01) |
| *C09K 8/68* | (2006.01) |
| *C09K 8/12* | (2006.01) |
| *C09K 8/40* | (2006.01) |
| *C09K 8/88* | (2006.01) |
| *C09K 8/74* | (2006.01) |

(52) U.S. Cl.
CPC . *C09K 8/12* (2013.01); *C09K 8/508* (2013.01); *C09K 2208/18* (2013.01); *C09K 8/68* (2013.01); *C09K 8/40* (2013.01); *C09K 8/88* (2013.01); *C09K 8/74* (2013.01)
USPC ........... 166/300; 166/279; 166/292; 166/293; 175/64; 175/72

(58) Field of Classification Search
USPC ............ 166/291, 292, 293, 300, 279; 175/64, 175/72
See application file for complete search history.

(56) References Cited

U.S. PATENT DOCUMENTS

| | | | |
|---|---|---|---|
| 2,779,418 A | 1/1957 | Garst | |
| 2,935,129 A | 5/1960 | Allen et al. | |
| 5,030,366 A * | 7/1991 | Wilson et al. | 507/228 |
| 5,314,022 A * | 5/1994 | Cowan et al. | 166/293 |
| 5,663,123 A * | 9/1997 | Goodhue et al. | 507/225 |
| 5,684,075 A | 11/1997 | Patel et al. | |
| 5,804,535 A * | 9/1998 | Dobson et al. | 507/111 |
| 6,063,737 A * | 5/2000 | Haberman et al. | 507/261 |
| 6,283,213 B1 * | 9/2001 | Chan | 166/291 |
| 6,435,277 B1 | 8/2002 | Qu et al. | |
| 6,831,043 B2 * | 12/2004 | Patel et al. | 507/133 |
| 7,081,439 B2 | 7/2006 | Sullivan et al. | |

(Continued)

FOREIGN PATENT DOCUMENTS

| | | |
|---|---|---|
| CA | 2575501 A1 | 6/2006 |
| CA | 2669627 A1 | 6/2008 |

(Continued)

OTHER PUBLICATIONS

Halliburton Brochure entitled BioVert™ H150 Diverter and Fluid Loss Control Material; 2008.

(Continued)

*Primary Examiner* — Zakiya W Bates
*Assistant Examiner* — Silvana Runyan
(74) *Attorney, Agent, or Firm* — McDermott Will & Emery LLP; Craig W. Roddy

(57) ABSTRACT

Treatment fluid compositions may comprise transient polymer networks for use in methods related to subterranean applications. In one aspect, a method may include providing a treatment fluid comprising an aqueous base fluid and a transient polymer network, and placing the treatment fluid in a subterranean formation. In another aspect, a subterranean treatment fluid may include an aqueous-base fluid and a transient polymer network.

22 Claims, 8 Drawing Sheets

(56) References Cited

U.S. PATENT DOCUMENTS

| | | | |
|---|---|---|---|
| 7,351,681 B2 * | 4/2008 | Reddy et al. | 507/219 |
| 7,858,561 B2 | 12/2010 | Abad et al. | |
| 7,985,718 B2 | 7/2011 | Steinbrenner et al. | |
| 8,053,396 B2 | 11/2011 | Huff et al. | |
| 8,148,303 B2 | 4/2012 | Van Zanten et al. | |
| 8,618,026 B2 | 12/2013 | Ezell et al. | |
| 2003/0054962 A1 | 3/2003 | England et al. | |
| 2003/0134751 A1 | 7/2003 | Lee et al. | |
| 2004/0043905 A1 * | 3/2004 | Miller et al. | 507/100 |
| 2004/0211558 A1 * | 10/2004 | Morales et al. | 166/250.1 |
| 2005/0107265 A1 | 5/2005 | Sullivan et al. | |
| 2005/0107503 A1 * | 5/2005 | Couillet et al. | 524/249 |
| 2005/0119401 A1 | 6/2005 | Bavouzet et al. | |
| 2005/0194145 A1 | 9/2005 | Beckman et al. | |
| 2005/0252659 A1 | 11/2005 | Sullivan et al. | |
| 2006/0046937 A1 | 3/2006 | Fu et al. | |
| 2006/0128597 A1 | 6/2006 | Chen et al. | |
| 2006/0258541 A1 | 11/2006 | Crews | |
| 2007/0066491 A1 | 3/2007 | Bicerano et al. | |
| 2007/0123431 A1 | 5/2007 | Jones et al. | |
| 2007/0281869 A1 * | 12/2007 | Drochon et al. | 507/219 |
| 2008/0110618 A1 | 5/2008 | Quintero et al. | |
| 2008/0121395 A1 * | 5/2008 | Reddy et al. | 166/280.2 |
| 2008/0194435 A1 | 8/2008 | Huff et al. | |
| 2008/0236823 A1 | 10/2008 | Willberg et al. | |
| 2009/0008091 A1 | 1/2009 | Quintero et al. | |
| 2009/0111716 A1 | 4/2009 | Hough et al. | |
| 2009/0209438 A1 * | 8/2009 | Thieme et al. | 507/219 |
| 2009/0270280 A1 | 10/2009 | Zhang et al. | |
| 2010/0031418 A1 | 2/2010 | Op't Hof | |
| 2010/0081586 A1 | 4/2010 | Smith et al. | |
| 2010/0081587 A1 | 4/2010 | Van Zanten et al. | |
| 2010/0256025 A1 | 10/2010 | Van Zanten et al. | |
| 2010/0263863 A1 | 10/2010 | Quintero et al. | |
| 2010/0300759 A1 | 12/2010 | Passade-Boupat et al. | |
| 2011/0048718 A1 | 3/2011 | Van Zanten et al. | |
| 2011/0053812 A1 | 3/2011 | Ezell et al. | |
| 2011/0071056 A1 | 3/2011 | Saini et al. | |

FOREIGN PATENT DOCUMENTS

| | | | |
|---|---|---|---|
| CA | 2721973 | A1 | 10/2009 |
| CN | 1809622 | A | 7/2006 |
| CN | 1882672 | A | 12/2006 |
| CN | 101238193 | A | 8/2008 |
| EP | 0 037 699 | A2 | 10/1981 |
| EP | 2 085 448 | A1 | 8/2009 |
| GB | 2 383 355 | A | 6/2003 |
| GB | 2383355 | A | 6/2003 |
| GB | 2457151 | A | 8/2009 |
| WO | WO 02/070862 | A1 | 9/2002 |
| WO | WO02070862 | A1 | 9/2002 |
| WO | 2003056130 | A1 | 7/2003 |
| WO | WO 2009/006251 | A1 | 1/2009 |
| WO | WO 2009/030868 | A2 | 3/2009 |
| WO | WO2011/023966 | A1 | 3/2011 |
| WO | WO 2012/001361 | A1 | 1/2012 |
| WO | WO 2012038704 | A1 | 3/2012 |

OTHER PUBLICATIONS

Herzhaft; How to Unify Low-Shear-Rate Rheology and Gel Properties of Drilling Muds; A Transient Rheological and Structural Model for Complex Well Applications; IADC/SPE Drilling Conference, Miami Florida, 2006; IADC/SPE 99080.

Burrows; Benchmark Performance: Zero Barite Sag and Significantly Reduced Downhole Losses with the Industry's First clay-Free Synthetic-Based Fluid; IADC/SPE Drilling Conference; Dallas, Texas; 2004; IADC/SPE 87138.

Van Oort; New Flat-Rheology Synthetic-Based Mud for Improved Deepwater Drilling; Society of Petroleum Engineers; Houston, TX; 2004; SPE 90987.

Aleman et al.; Definitions of Terms Relating to the Structure and Processing of Sols, Gels, Networks, and Inorganic-Organic Hybrid Materials; IUPAC Recommandations 2007, Pure Appl. Chem., vol. 79, No. 10, pp. 1801-1829; XP-002603495.

International Search Report and Written Opinion for PCT/GB2010/001629 dated Oct. 22, 2010.

International Search Report and Written Opinion for PCT/GB2010/001630 dated Oct. 19, 2010.

International Search Report and Written Opinion for PCT/GB2010/001631 dated Oct. 19, 2010.

International Search Report and Written Opinion for PCT/GB2011/001386 dated Dec. 2, 2011.

Penny et al., "The Application of Microemulsion Additives in Drilling and Stimulation Results in Enhanced Gas Production," 2005 SPE Production and Operations Symposium held in Oklahoma City, OK, SPE 94274.

International Search Report and Written Opinion for PCT/GB2011/001136 dated Sep. 29, 2011.

International Search Report and Written Opinion for PCT/GB2011/000988 dated Oct. 12, 2011.

International Search Report and Written Opinion for PCT/GB2012/000411 dated Jul. 19, 2012.

International Preliminary Report on Patentability for PCT/GB2010/0001629 dated Mar. 15, 2012.

Official Action for Canadian Patent Application No. 2,771,700 dated Mar. 18, 2013.

Official Action for Canadian Patent Application No. 2,772,108 dated Mar. 26, 2013.

Official Action for Canadian Patent Application No. 2,772,132 dated Apr. 10, 2013.

Official Action for Chinese Patent Application No. 201080045742.6 dated Aug. 22, 2013.

Official Action for Chinese Patent Application CN 201080045743.0 dated Jan. 22, 2014.

Official Action for EA Patent Application No. 201270354 dated Dec. 12, 2013.

* cited by examiner

TREATMENT FLUIDS COMPRISING TRANSIENT POLYMER NETWORKS

BACKGROUND

The present invention relates to methods for treating subterranean formations. More particularly, in certain embodiments, the present invention relates to methods of using in subterranean applications treatment fluids that comprise a transient polymer network.

In today's downhole technology, a large portion of the wells have been completed at depths of greater than 15,000 ft, and as a result, most previously designed treatment fluids and additives that were designed for more shallow wells may not perform adequately at temperatures and at pressures commonly associated with wells of greater depths. Wells at depths exceeding 15,000 ft often involve higher temperatures and pressures, necessitating the need for fluids and additives that will perform at these depths. In addition to the high temperatures and pressures, wells completed at these depths often produce fluids like carbon dioxide ($CO_2$) or hydrogen sulfide ($H_2S$).

Polymeric agents, such as cationic polymers, high molecular weight polyacrylamide polymers, polysaccharides, synthetic polymers, and the like, have previously been added to treatment fluids to obtain the desired properties for a variety of subterranean treatments. Such treatments include, but are not limited to, drilling, stimulation treatments (e.g., fracturing treatments, acidizing treatments), and completion operations (e.g., sand control treatments like gravel packing). As used herein, the term "treatment," or "treating," refers to any subterranean operation that uses a fluid in conjunction with a desired function and/or for a desired purpose. The term "treatment," or "treating," does not imply any particular action by the fluid or any particular component thereof.

Traditional treatment fluids may be grouped into two classifications. Such classifications include oil-based treatment fluids and aqueous-based treatment fluids. In the past, oil-based treatment fluids are thought to have some superior performance characteristics over aqueous-based treatment fluids. However, aqueous-based treatment fluids may be more economical to use and less damaging to the formation and to the environment.

One reason that oil-based treatment fluids are thought to have desirable characteristics is that they are better at maintaining sufficient shale inhibition. Proper shale inhibition is important in preventing wellbore instability. Aqueous-based treatment fluids often give rise to insufficient shale inhibition when such fluids are used in water-sensitive formations. The resultant swelling of the clays may give rise to solid-laden treatment fluids that are pumped at decreased speeds leading to the poor performance of water-based treatment fluids. In addition, the clays can damage the equipment used in a subterranean operation and slow down the overall effectiveness of the operation. In extreme scenarios, the clays may seal off a portion of the formation leading to loss of production. Another problem associated with aqueous-based treatment fluids is their incompatibility with heavy brines.

An important consideration for assessing the utility of a treatment fluid for a given purpose may include the fluid's Theological parameters. For use as a subterranean treatment fluid, a fluid generally should be capable of maintaining certain viscosities suitable for the desired operation. For example, a drilling fluid preferably has sufficiently viscosity to be capable of supporting and carrying the drill cuttings to the surface without being so viscous as to interfere with the drilling operation. Increased viscosity can result in problematic sticking of the drill string, and increased circulating pressures can contribute to lost circulation problems in the formation. Clays are commonly used as a way to maintain sufficient viscosity in such treatment fluids. These clays may typically require vigorous agitation in the fluid to reach a fully active state and provide an increase in viscosity. Time pressures may demand that fluids be prepared quickly for shipment to the drilling operation. As a result, inadequate shear and over-treatment may occur when using clays.

Aqueous treatment fluids which do not contain organophilic clays may offer many advantages if they can retains the performance of an oil-based treatment fluid while maintaining the many of the benefits of using an aqueous-based treatment fluid.

SUMMARY

The present invention relates to methods for treating subterranean formations. More particularly, in certain embodiments, the present invention relates to methods of using in subterranean applications treatment fluids that comprise a transient polymer network.

In one embodiment, the present invention provides a method comprising: providing a treatment fluid comprising an aqueous base fluid and a transient polymer network, and placing the treatment fluid in a subterranean formation.

In one embodiment, the present invention provides a method comprising: providing a drilling fluid comprising an aqueous base fluid and a transient polymer network; and using the drilling fluid to drill at least a portion of a well bore in a subterranean formation.

In one embodiment, the present invention provides a method comprising: providing a treatment fluid comprising an aqueous base fluid and a transient polymer network; introducing the treatment fluid into a subterranean formation; allowing the treatment fluid to suspend and carry particulates from the well bore to the surface of a well site located above the subterranean formation; introducing a cement composition into the subterranean formation; and allowing the cement to set in the well bore.

In one embodiment, the present invention provides a subterranean treatment fluid comprising: an aqueous-base fluid and a transient polymer network.

The features and advantages of the present invention will be readily apparent to those skilled in the art upon a reading of the description of the embodiments that follows.

BRIEF DESCRIPTION OF THE DRAWINGS

These drawings illustrate certain aspects of some of the embodiments of the present invention, and should not be used to limit or define the invention.

Figure 1:
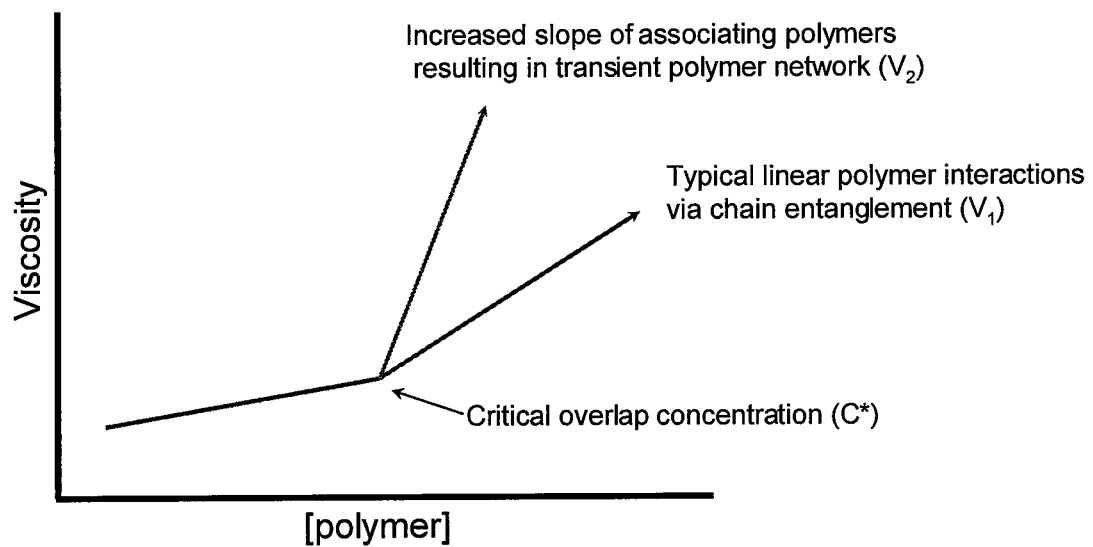
FIG. 1 is a graphical illustration of the viscosities in treatment fluids comprising transient polymer networks.

While the present invention is susceptible to various modifications and alternative forms, specific embodiments thereof have been shown by way of example in the figures and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DESCRIPTION OF THE PREFERRED EMBODIMENTS

The present invention relates to methods for treating subterranean formations. More particularly, in certain embodiments, the present invention relates to methods of using in subterranean applications treatment fluids that comprise a transient polymer network.

There may be several potential advantages to the methods and compositions of the present invention, only some of which will be discussed herein. One of the many potential advantages of the methods and compositions of the present invention is that they may allow for, inter alia, better performing aqueous treatment fluids for use in subterranean formations than traditional aqueous treatment fluids. In some embodiments, the aqueous-based treatment fluids used in the present invention provide better greater thermal stability, while maintaining the performance capabilities of traditional oil-based treatment fluids. Additionally, the transient polymer networks used in the present invention have a greater solubility in a wider range of aqueous media. In some embodiments, the treatment fluids of the present invention have improved suspension characteristics as a result of changes in the rheological properties of a fluid as a result of the formation of the transient polymer network. In one example, the treatment fluid of the present invention may have improved suspension characteristics that are useful for carrying weighting agents and drill cuttings. Additionally, the treatment fluids of the present invention may be more cost efficient (compared to most synthetic additives) and environmentally friendly when compared to other commonly used polymeric aqueous-based or oil-based treatment fluids. In addition, the methods and compositions of the present invention may allow for faster pumping rates due to the more efficient removal of solids from the treatment fluids.

For the purposes of describing the treatment fluids of the present invention and the transient polymer networks described herein, it is useful to describe certain rheological properties including yield point ("YP"), low-shear viscosity, plastic viscosity ("PV"), the equivalent circulating density ("ECD"), and yield stress (tau zero). The YP is defined as the value obtained from the Bingham-Plastic rheological model when extrapolated to a shear rate of zero. It may be calculated using 300 revolutions per minute ("rpm") and 600 rpm shear rate readings on a standard oilfield rheometer. Similarly, the yield stress or Tau zero is the stress that must be applied to a material to make it begin to flow (or yield), and may commonly be calculated from rheometer readings measured at rates of 3, 6, 100, 200, 300 and 600 rpm. The extrapolation may be performed by applying a least-squares fit or curve fit to the Herchel-Bulkley rheological model. A more convenient means of estimating the yield stress is by calculating the low-shear yield point ("LSYP") by the same formula shown below in Equation 2 though with the 6 rpm and 3 rpm readings substituted for the 600- and 300-rpm readings, respectively. PV represents the viscosity of a fluid when extrapolated to infinite shear rate. A low PV may indicate that a fluid is capable of drilling rapidly because, among other things, the low viscosity of fluid exiting the drill bit and the ability to use an increased flow rate. A high PV may be caused by a viscous base fluid, excess colloidal solids, or both. The PV and YP are calculated by the following set of equations:

$$PV = (600 \text{ rpm reading}) - (300 \text{ rpm reading}) \quad \text{(Equation 1)}$$

$$YP = (300 \text{ rpm reading}) - PV \quad \text{(Equation 2)}$$

The ECD is the effective circulating density exerted by a fluid against the formation taking into account the flow rate and pressure drop in the annulus above the point being considered. A high PV may increase the ECD due to a greater pressure drop in the annulus caused by internal fluid friction. The treatment fluids of the present invention are thought to provide better ECD control.

These rheological properties may be measured using standard testing procedures and standard testing equipment known to those skilled in the art. For example, properties such as plastic viscosity expressed in centipoises, low-shear viscosity expressed in dial readings, yield point and LSYP expressed in lb/100 ft2, and gel strength expressed in lb/100 ft2 may be determined by the "ANSI/API RP 13B-2: Recommended Practice for Field Testing Oil-based Drilling Fluids," as of the time of filing, using a 115-volt motor-driven viscometer, such as a FANN® Model 35-A V-G Meter, which is incorporated herein by reference in its entirety. The rotational measurements represent standard rates at which readings may be taken. Actual rotational rates may vary slightly and may be corrected using correction factors, if necessary.

The treatment fluids of the present invention comprise an aqueous base fluid and a transient polymer network. In some embodiments, the transient polymer network may comprise residual monomer remaining. The transient polymer networks are formed by the association of networking forming polymers that form a network comprising microdomains within the aqueous fluid. Optionally, the treatment fluids of the present invention may comprise additional components.

The aqueous base fluids utilized in embodiments of the treatment fluids of the present invention may be fresh water, salt water (e.g., water containing one or more salts dissolved therein), brine (e.g., saturated salt water), seawater, and any combination thereof. The brines may contain substantially any suitable salts, including, but not necessarily limited to, salts based on metals, such as calcium, magnesium, sodium, potassium, cesium, zinc, aluminum, and lithium. The salts may contain substantially any anions, with preferred anions being less expensive anions including, but not necessarily limited to chlorides, bromides, formates, acetates, and nitrates. The choice of brine may increase the associative properties of the transient polymer network in the treatment fluid. A person of ordinary skill in the art, with the benefit of this disclosure, will recognize the type of brine and ion concentration needed in a particular application of the present invention depending on, among other factors, the other components of the treatment fluids, the desired associative properties of such fluids, and the like. Generally, the aqueous fluid may be from any source, provided that it does not contain an excess of compounds that may adversely affect other components in the treatment fluid. The aqueous base fluid may be present in embodiments of the treatment fluids of the present invention in an amount in the range of about 20% to about 99% by weight of the treatment fluid. In certain embodiments, the base fluid may be present in the treatment fluids of the present invention in an amount in the range of about 20% to about 80% by weight of the treatment fluid.

Figure 2:
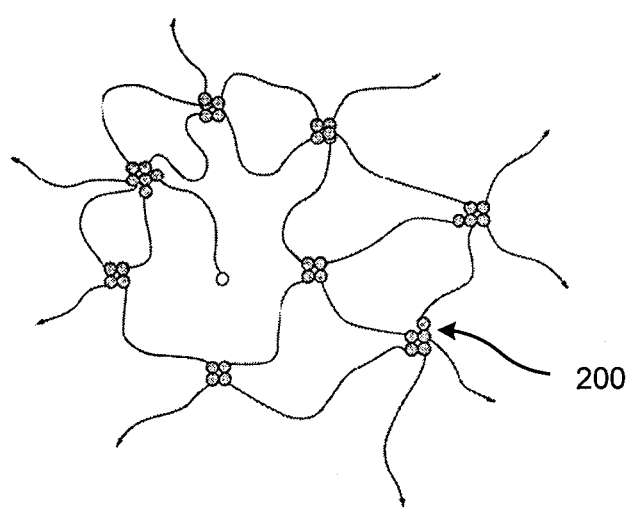
FIG. 2 is an illustration of a transient polymer network disclosed in the present invention.

"Transient polymer network(s)," as that term is used herein, refers to inter- and intramolecularly associative systems (i.e., networks) of networking forming polymers that form associations via, e.g., physical crosslinks, Van der Waals forces and/or electrostatic interactions, and impart elastic and suspension properties within a fluid. A simplified hypothetical diagram of a transient polymer network used in the present invention is shown by FIG. 2. Examples of microdomains are shown are shown at 200.

Figure 3:
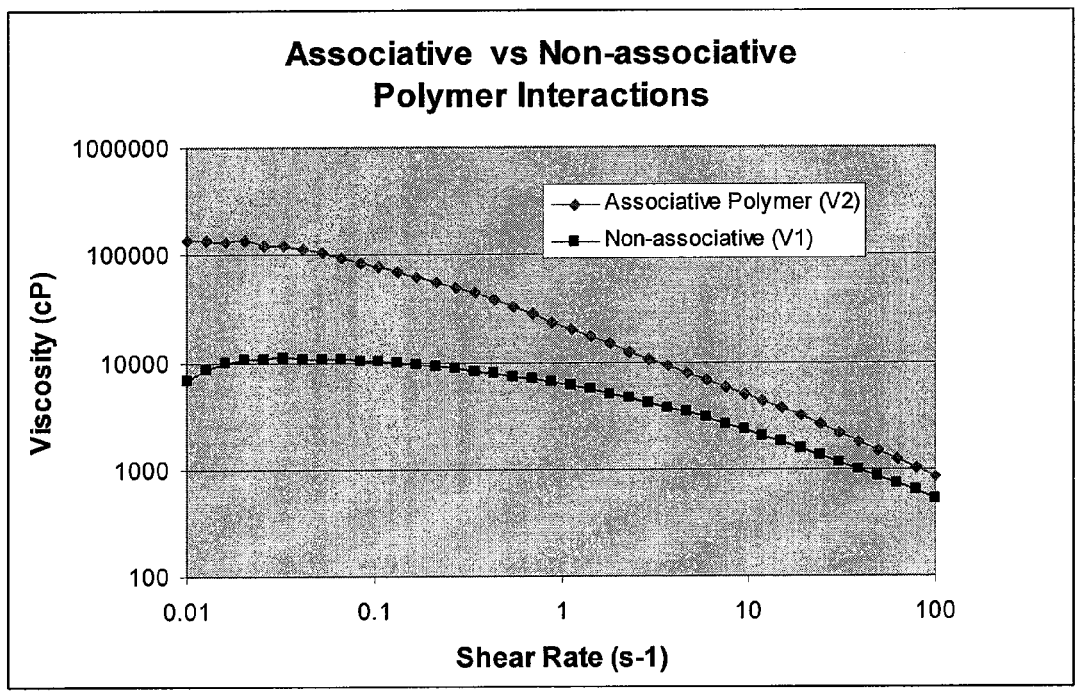
FIG. 3 is a graphical representation of the rheological performance of a fluid containing the transient polymer networks versus various other fluids without the transient polymer networks.

The formation of such transient polymer networks in the treatment fluid may be determined by examining the viscosity of a treatment fluid at zero-shear. For example, a fluid comprising a given non-associated polymer (i.e., one that is not part of a transient polymer network) with a known molecular weight (MW1) will have a given intrinsic viscosity (V1) in a treatment fluid at zero shear. A fluid comprising the same polymer with the same molecular weight (MW1) that has formed a transient polymer network through molecular associations as described above will have a higher viscosity (V2) at zero shear as compared to V1 at zero shear. A higher V2 indicates that a transient polymer network has formed in the fluid. This V2/V1 difference is shown by FIG. 3.

Figure 4:
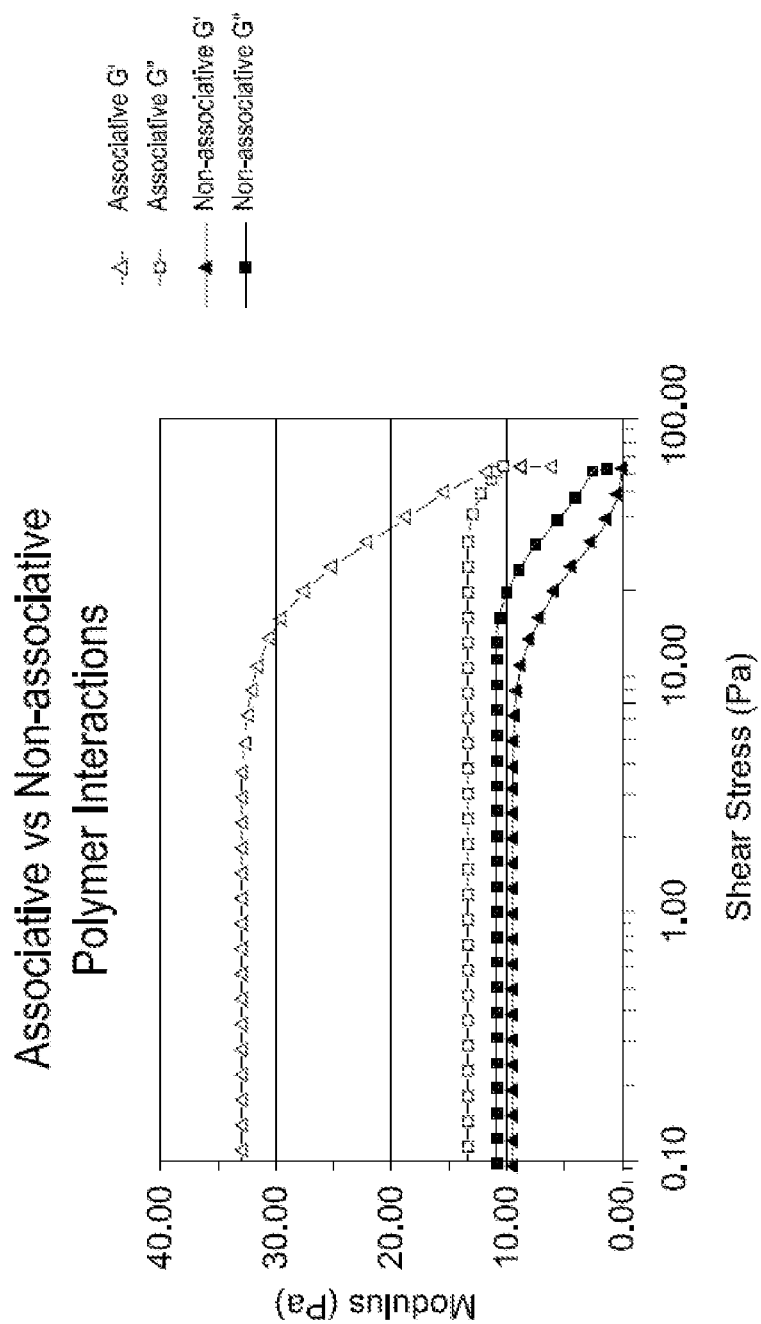
FIG. 4 is a graphical representation of the rheological performance of a fluid containing the transient polymer networks versus a fluid containing non-associative polymers.
Figure 8:
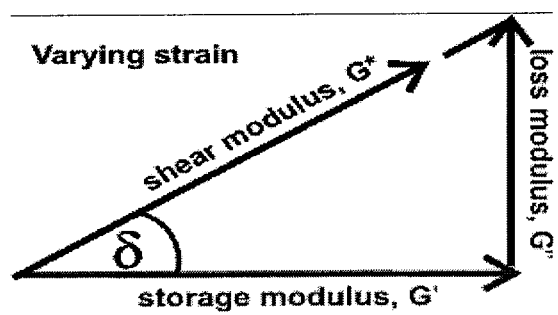
FIG. 8 is a graphical representation of shear modulus based on changing strain.

The following discussion is in reference to FIG. 4 and FIG. 8. The shear modulus (resulting from changing strain) is the ratio of the shear stress to the shear strain. It follows from the complex relationship similar to the above that:

$$G^* = G' + iG''$$ (Equation 3)

where G* is the complex shear modulus, G' is the in-phase storage modulus (i.e., elastic component) and G" is the out-of-phase similarly-directed loss modulus (viscous component); $G^* = \sqrt{(G'2 + G''2)}$. The frequency where these parameters cross over corresponds to a relaxation time (τ) specific for the material. Thus, it follows that, $$\tan(\delta) = G''/G'$$ (Equation 4)

where tan(δ) quantifies the balance between energy loss and storage. As tan(45°)=1, a value for tan(δ) greater than unity indicates more "liquid-like" properties, whereas one lower than unity means more "solid-like" properties, regardless of the viscosity. For treatment fluids comprising transient polymer networks, the tan(δ) would likely be less than 1, whereas fluids comprising nonassociative polymers would have a tan (δ) closer to 1 or equal to 1 if not above 1.

FIG. 4 provides an example of the various responses from dynamic shear testing. The associative networks develop viscoelastic character (increased G') versus the purely viscous solution from the non-associative networks. The elastic component remains until enough shear is applied to disrupt the associations resulting in thixotropic behavior. Such properties result in increased suspension of associative networks over that of non-associative polymers.

Another way to understand this rheological phenomena associated with treatment fluids that comprise transient polymer networks versus those that have nonassociated polymer is to examine the slopes of the Theological curves for these treatment fluids. The slope of the Theological curve for the treatment fluid comprising the transient polymer networks will vary greatly from the slope of the rheological curve for the treatment fluids comprising the non-associated polymer. A theoretical example of this increased slope can be easily seen in FIG. 1, as indicated therein.

The transient polymer networks are thought to impart increased YP, low shear viscosity (or zero shear viscosity), and overall improved suspension without substantially increasing the PV of the treatment fluid. A low PV may help minimize the amount of density increase, or equivalent circulating density, caused by pumping the fluid. In certain embodiments, the YP values in the treatment fluids may range from about 5 to about 100 and the PV values may range from about 5 to about 50. Additionally, the transient polymer networks when formed in the aqueous treatment fluid are thought to improve the suspension characteristics of the fluid. These values and effects may be influenced by many factors including, but not limited to, temperature, pressure, and solubility.

In some embodiments, a fluid comprising a transient polymer network is able to maintain structure in a stress range exceeding about 12 Pa.

The nature of the associations in the transient polymer network depends on a variety of factors, including, but not limited to, the degree of hydrophobic modification on the polymer, the microstructure of the polymer, and the concentration of the polymer in the fluid. In certain embodiments, intrapolymer interactions may become more prominent at low polymer concentrations and high hydrophobe density along the hydrophilic polymer backbone. In such embodiments, a compact, globular conformation may be formed giving rise to organized, hydrophobic microdomains in the network with micelle-like properties. In other embodiments, interpolymer interactions may be more prominent, usually at lower hydrophobe/hydrophile ratios and at higher polymer concentrations. The high polymer concentration may lead to chain overlap and hydrophobic clustering that increases the viscosity of the treatment fluid by forming a transient polymer network. One of ordinary skill in the art, with the benefit of this disclosure, will recognize the conditions necessary to obtain the proper intrapolymer and interpolymer associations to form the transient polymer networks of the present invention.

The network forming polymers that may be used to form the transient polymer networks of the present invention may be synthesized by incorporating hydrophobic groups within a hydrophilic polymer backbone of a base polymer using any suitable method. Suitable methods include chain growth polymerization, step growth polymerization, and post-polymerization mechanisms for naturally occurring polymers and polymers that were made by chain or step growth polymerization. In most instances, this is not a post-polymerization modification. Thus, the hydrophobic modification is incorporated within the polymer structure as it forms. However, in some instances, this modification may be performed post-polymerization, for example, through a suitable modification reaction. Residual monomer may remain in the polymer. Such modified polymers are referred to herein as network forming polymers.

Suitable examples hydrophobic modifications for use in embodiments of the present invention include those formed by the addition of a hydrocarbon group having from about 1 to about 24 carbon atoms that, for example, may comprise a linear or branched alkyl, alkenyl, aryl, alkylaryl, arylalkyl, cycloalkyl, acryloyl, or a mixture thereof. In some embodiments, the hydrocarbon groups may comprise 3 to 16 carbon atoms.

In certain embodiments, the networking forming polymer or polymers may have a molecular weight in the range from about 500,000 to about 10,000,000. In some embodiments, the molecular weight range may be in the 1,000,000 range +/−500,000. In some embodiments, this molecular weight may vary. One of ordinary skill in the art with the benefit of this disclosure will recognize the appropriate size for a given application.

Suitable network forming polymers may include, but are not necessarily limited to, those that comprise units based on: acrylamides, vinyl alcohols, vinylpyrrolidones, vinylpyridines, acrylates, polyacrylamides, polyvinyl alcohols, polyvinylpyrrolidones, polyvinylpyridines, polyacrylates, polybutylene succinate, polybutylene succinate-co-adipate, polyhydroxybutyrate-valerate, polyhydroxybutyrate-covalerate, polycaprolactones, polyester amides, polyethylene terephthalates, sulfonated polyethylene terephthalate, polyethylene oxides, polyethylenes, polypropylenes, aliphatic aromatic copolyester, polyacrylic acids, polysaccharides (such as dextran or cellulose), chitins, chitosans, proteins, aliphatic polyesters, polylactic acids, poly(glycolides), poly(ε-caprolactones), poly(hydroxy ester ethers), poly(hydroxybutyrates), poly(anhydrides), polycarbonates, poly(orthoesters), poly(amino acids), poly(ethylene oxides), poly(propylene oxides), poly(phosphazenes), polyester amides, polyamides, polystyrenes, any derivative thereof, any copolymer, homopolymer, or terpolymer, or any combination thereof. In a further option, the polymer may comprise a compound selected from the group consisting of hydroxyethyl acrylate, acrylamide and hydroxyethyl methacrylate.

The networking forming polymers of the present invention should be added to the aqueous base fluid in an amount sufficient to form the desired transient polymer networks within the treatment fluid. The network forming polymers should be included in the treatment fluids of the present invention in any amount sufficient for a particular application. In certain embodiments, the network forming polymers may be present in amount in the range of about 0.01% to about 15% by weight of the treatment fluid. In certain embodiments, the networking forming polymers may be present in an amount of about 0.1% to about 2% by weight of the treatment fluid. A person of ordinary skill in the art, with the benefit of this disclosure, will recognize the necessary amount of network forming polymer or polymers to include in a particular application of the present invention depending on, among other factors, the other components of the treatment fluids, the desired properties of the transient polymer networks in the treatment fluids, and the like.

In certain embodiments, the network forming polymers of the transient polymer networks may be a linear or branched. In some instances, linear polymer backbones may have better associative properties since they may be able to fold back and forth with less steric hindrance.

In some embodiments, the monomer that will form a polymer may include an unsaturated group, such as a monomer including a vinyl group. Exemplary vinyl-containing monomers may be described by the formula C(R1)(R2)=C(R3)(R4), wherein R1, R2, R3 and R4 are segments rendering the solubility or swellability of this monomer in a common solvent. Optionally, R1, R2, R3 and R4 can each be independently selected from, but not limited to, hydrogen, methyl, ethyl, $CONH_2$, $CONHCH_3$, $CON(CH_3)_2$, $CH_2SO_3H$, $CH_2SO_3Na$, and COONa.

In some embodiments, the network forming polymers may be formed by a reaction mechanism incorporating an initiator. Suitable initiators may include radical initiators. Examples of suitable initiators may include, but are not limited to, 2,2'-azobis-(2-methylbutyronitrile), 2,2'-azobis(isobutyramidine hydrochloride), 2,2'-azobis[2-(2-imidazolin-2-yl)propane] dihydrochloride, 1,1'-azobis(cyclohexanecarbonitrile), 2,2'-azobis(2-methylpropionamidine)dihydrochloride, 4,4'-azobis(4-cyanovaleric acid), ammonium persulfate, hydroxymethanesulfinic acid monosodium salt dihydrate, potassium persulfate, sodium persulfate, benzoyl peroxide, 1,1-bis(tert-amylperoxy)cyclohexane, 1,1-bis(tert-butylperoxy)cyclohexane, 2,2-bis(tert-butylperoxy)butane, 2,4-pentanedione peroxide, 2,5-bis(tert-butylperoxy)-2,5-dimethylhexane, 2,5-di(tert-butylperoxy)-2,5-dimethyl-3-hexyne; 2-butanone peroxide, cumene hydroperoxide, di-tert-amyl peroxide, dicumyl peroxide, lauroyl peroxide, tert-butyl hydroperoxide, tert-butyl peracetate, tert-butyl peroxide, tert-butyl peroxybenzoate, tert-butylperoxy-2-ethylhexyl carbonate, diethylene glycol dimethacrylate, azobisisobutyronitrile, and any combination thereof. A person of ordinary skill in the art would be able to select an appropriate initiator based upon the network forming polymer or monomer involved in the particular reaction. Other suitable initiators may include photoinitiators, thermal initiators, and any combination thereof.

In certain embodiments of the present invention, the hydrophilic network forming polymers comprise a polymer backbone, the polymer backbone comprising polar heteroatoms, wherein the polar heteroatoms present within the polymer backbone of the hydrophilic network forming polymers include, but are not limited to, oxygen, nitrogen, sulfur, or phosphorous.

Figure 5:
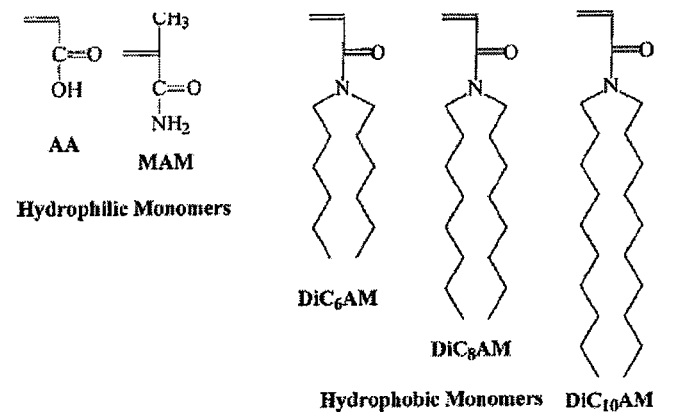
FIG. 5 is a simplified example of a synthesis scheme for the transient polymer networks of the present invention.
Figure 5:
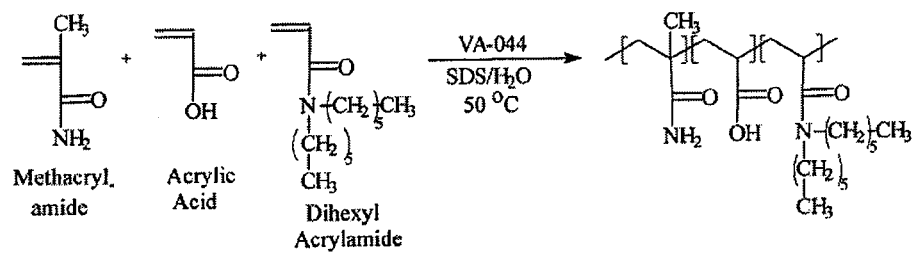

An example of a synthesis scheme appropriate for use in the synthesis of the network forming polymers for use in the present invention is shown in FIG. 5. FIG. 5 illustrates a scheme wherein a hydrophillic polymer is hydrophobically modified using an initiator to produce a network forming polymer as shown.

Preferably, the treatment fluids of the present invention may be broken with shear to aid pumpability and recovery of the treatment fluid. In certain embodiments, the transient polymer networks may reform in the absence of shear to reviscosify the treatment fluid. If a chemical breaker is used, one should note that this reversability characteristic may be altered.

Additional additives may be included in the treatment fluids of the present invention as desired for a particular application, including, but not limited to, surfactants, bridging agents, polyols, fluid loss control agents, pH-adjusting agents, pH buffers, shale stabilizers, and any combination thereof. For example, polyols may be included in a treatment fluid and may improve thermal stability. Furthermore, a variety of additional additives suitable for use in the chosen operation may be included in the treatment fluid as deemed appropriate by one skilled in the art, with the benefit of this disclosure.

In some embodiments, the treatment fluids of the present invention may have increased thermal stability when in the presence of brine versus water. In certain embodiments, the increase in thermal stability can be attributed to the minimization of the hydrolytic attack due to decreased free water in the treatment fluid. In other embodiments, it is believed that the increase in thermal stability in aqueous base fluid may be due to changing the contact of the aqueous media with the backbone of the polymer chains, e.g., by facilitating the protection of the acetal linkage (e.g., 1,4-glycocidic linkage) of the backbone. The acetal linkage is thought to be generally unprotected in non-associated unmodified polymers.

Figure 6:
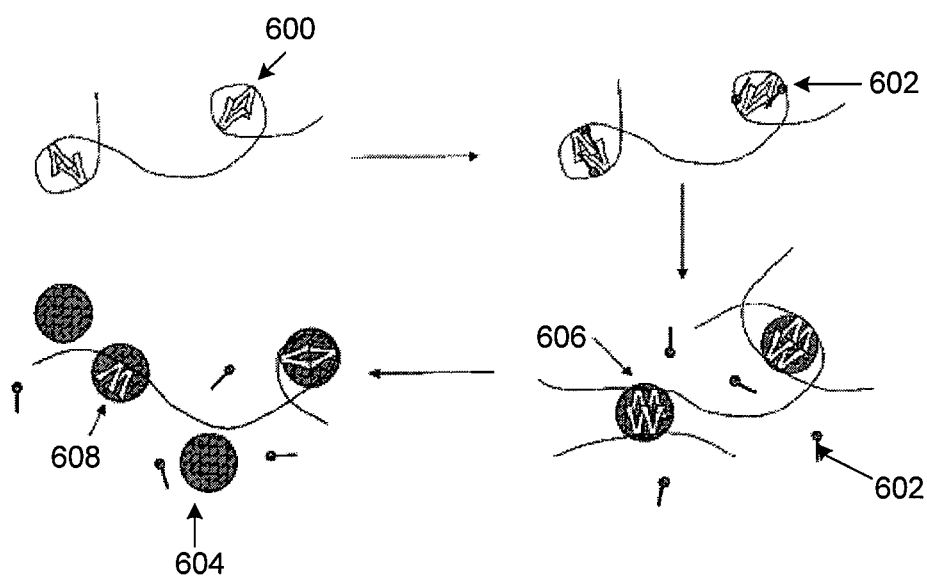
FIG. 6 is a graphical representation of the role of surfactants as discussed herein.

In some embodiments, surfactants may be used to facilitate the formation of the associations. It is believed that the hydrophobic groups of the network forming polymers may become incorporated into surfactant micelles, which may act as a type of crosslinker. A surfactant may be used to improve stability of the treatment fluid, such as the treatment fluid of the present invention, by improving the formation of microdomains through the formation of "hemi-micelle" junctions that help stabilize and solubilize the hydrophobic interactions. Such interchain interactions with surfactants is shown in FIG. 6. Shown at 600 are hydrophobes. With increasing surfactant concentration, the hydophobes 600 interact with the free surfactant 602 to eventually form hemimicelles 606. As the concentration increases, the hemimicelles 606 form micelles 604 and solubilizing micelles at 608.

In certain embodiments, suitable surfactants may be a non-viscoelastic surfactant. Suitable surfactants may be anionic, neutral, cationic or zwitterionic. Polymeric surfactants may also be used. Aqueous liquids containing the surfactants may respond to shear with a Newtonian or viscoelastic behavior. Anionic surfactants with Newtonian rheological behavior are preferred. Examples of suitable anionic surfactants include, but are not limited to, sodium decylsulfate, sodium lauryl sulfate, alpha olefin sulfonate, alkylether sulfates, alkyl phosphonates, alkane sulfonates, fatty acid salts, arylsulfonic acid salts, and any combination thereof. Examples of suitable cationic surfactants, include, but are not limited to, trimethylcocoammonium chloride, trimethyltallowammonium chloride, dimethyldicocoammonium chloride, bis(2-hydroxyethyl)tallow amine, bis(2-hydroxyethyl)erucylamine, bis(2-hydroxyethyl)coco-amine, cetylpyridinium chloride, and any combination thereof. Preferably, the surfactant chosen should show Newtonian or viscoelastic behavior when present in water by itself in concentrations of less than 20%.

In certain other embodiments, the surfactant may be a viscoelastic surfactant. The viscoelastic surfactants used in the present invention may comprise any viscoelastic surfactant known in the art, any derivative thereof, or any combination thereof. These viscoelastic surfactants may be cationic, anionic, nonionic or amphoteric in nature. The viscoelastic surfactants may comprise any number of different compounds, including methyl ester sulfonates (e.g., as described in U.S. Pat. Nos. 7,299,874, 7,159,659, 7,303,019 and U.S. Patent Publication Number 2006/0183646, filed Feb. 15, 2005, the entire disclosures of which are incorporated herein by reference), hydrolyzed keratin (e.g., as described in U.S. Pat. No. 6,547,871, the entire disclosure of which is incorporated herein by reference), sulfosuccinates, taurates, amine oxides, ethoxylated amides, alkoxylated fatty acids, alkoxylated alcohols (e.g., lauryl alcohol ethoxylate, ethoxylated nonyl phenol), ethoxylated fatty amines, ethoxylated alkyl amines (e.g., cocoalkylamine ethoxylate), betaines, modified betaines, alkylamidobetaines (e.g., cocoamidopropyl betaine), quaternary ammonium compounds (e.g., trimethyltallowammonium chloride, trimethylcocoammonium chloride), derivatives thereof, and any combination thereof. The term "derivative" is defined herein to include any compound that is made from one of the listed compounds, for example, by replacing one atom in the listed compound with another atom or group of atoms, rearranging two or more atoms in the listed compound, ionizing the listed compounds, or creating a salt of the listed compound.

CROSS REFERENCE TO RELATED APPLICATIONS

Suitable viscoelastic surfactants may comprise mixtures of several different compounds, including but not limited to: mixtures of an ammonium salt of an alkyl ether sulfate, a cocoamidopropyl betaine surfactant, a cocoamidopropyl dimethylamine oxide surfactant, sodium chloride, and water; mixtures of an ammonium salt of an alkyl ether sulfate surfactant, a cocoamidopropyl hydroxysultaine surfactant, a cocoamidopropyl dimethylamine oxide surfactant, sodium chloride, and water; mixtures of an ethoxylated alcohol ether sulfate surfactant, an alkyl or alkene amidopropyl betaine surfactant, and an alkyl or alkene dimethylamine oxide surfactant; aqueous solutions of an alpha-olefinic sulfonate surfactant and a betaine surfactant; and any combination thereof. Examples of suitable mixtures of an ethoxylated alcohol ether sulfate surfactant, an alkyl or alkene amidopropyl betaine surfactant, and an alkyl or alkene dimethylamine oxide surfactant are described in U.S. Pat. No. 6,063,738, the entire disclosure of which is incorporated herein by reference. Examples of suitable aqueous solutions of an alpha-olefinic sulfonate surfactant and a betaine surfactant are described in U.S. Pat. No. 5,897,699, the entire disclosure of which is incorporated herein by reference. Suitable viscoelastic surfactants also may comprise "catanionic" surfactant systems, which comprise paired oppositely-charged surfactants that act as counterions to each other and may form wormlike micelles. Examples of such catanionic surfactant systems include, but are not limited to sodium oleate (NaO)/octyl trimethylammonium chloride (C8TAC) systems, stearyl trimethylammonium chloride (C18TAC)/caprylic acid sodium salt (NaCap) systems, and cetyl trimethylammonium tosylate (CTAT)/sodium dodecylbenzenesulfonate (SDBS) systems.

Figure 7:
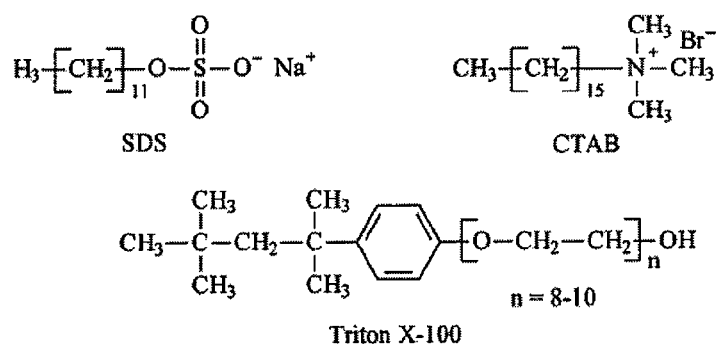
FIG. 7 depicts representative surfactant structures for use in the treatment fluids of the present invention.

Examples of commercially-available viscoelastic surfactants suitable for use in the present invention may include, but are not limited to, MIRATAINE BET-0 30™ (an oleamidopropyl betaine surfactant available from Rhodia Inc., Cranbury, N.J.), AROMOX APA-T (amine oxide surfactant available from Akzo Nobel Chemicals, Chicago, Ill.), ETHOQUAD O/12 PG™ (a fatty amine ethoxylate quat surfactant available from Akzo Nobel Chemicals, Chicago, Ill.), ETHOMEEN T/12™ (a fatty amine ethoxylate surfactant available from Akzo Nobel Chemicals, Chicago, Ill.), ETHOMEEN S/12™ (a fatty amine ethoxylate surfactant available from Akzo Nobel Chemicals, Chicago, Ill.), and REWOTERIC AM TEG™ (a tallow dihydroxyethyl betaine amphoteric surfactant available from Degussa Corp., Parsippany, N.J.). Where used, the surfactant may be included in the treatment fluid in an amount of about 0.1% to about 20% by weight of the treatment fluid. One should note that if too much surfactant is used that the formation of micelles in the fluid may negatively impact the overall fluid. Representative structures of suitable surfactants for use in the present invention are shown by FIG. 7.

The treatment fluids of the present invention optionally may comprise a pH buffer. The pH buffer may be included in the treatment fluids of the present invention to maintain pH in a desired range, inter alia, to enhance the stability of the treatment fluid. Examples of suitable pH buffers include, but are not limited to, sodium carbonate, potassium carbonate, sodium bicarbonate, potassium bicarbonate, sodium or potassium diacetate, sodium or potassium phosphate, sodium or potassium hydrogen phosphate, sodium or potassium dihydrogen phosphate, sodium borate, sodium or ammonium diacetate, magnesium oxide, sulfamic acid, and the like. The pH buffer may be present in a treatment fluid of the present invention in an amount sufficient to maintain the pH of the treatment fluid at a desired level. One of ordinary skill in the art, with the benefit of this disclosure, will recognize the appropriate pH buffer and amount of pH buffer to use for a chosen application.

Optionally, the treatment fluids of the present invention further may include pH-adjusting compounds for adjusting the pH of the treatment fluid, inter alia, to a desired pH for the desired operation. Suitable pH-adjusting compounds include any pH-adjusting compound that does not adversely react with the other components of the treatment fluid. Examples of suitable pH-adjusting compounds include, but are not limited to, sodium hydroxide, potassium hydroxide, lithium hydroxide, sodium carbonate, potassium carbonate, fumaric acid, formic acid, acetic acid, acetic anhydride, hydrochloric acid, hydrofluoric acid, citric acid, hydroxyfluoboric acid, polyaspartic acid, polysuccinimide, ammonium diacetate, sodium diacetate, and sulfamic acid. The appropriate pH-adjusting compound and amount thereof may depend upon the formation characteristics and conditions, and other factors known to individuals skilled in the art with the benefit of this disclosure.

The treatment fluids of the present invention may comprise shale stabilizers. Examples of suitable shale stabilizers include, but are not limited to, long chain alcohols, polyols, amine inhibitor, sodium or potassium silicate, partially hydrolyzed polyacrylamides, polyalkene glycols, anionic surfactants, salt solutions containing, for example, sodium chloride, potassium chloride, or ammonium chloride; cationic polymers and oligomers, for example, poly(dimethyldiallylammonium chloride), cationic poly(acrylamide) and cationic poly(diemethylaminoethylmethacrylate). Generally, introducing the fluid containing the shale stabilizer into the portion comprises squeezing the fluid into the porosity of the portion of the subterranean formation so that the shale stabilizer acts to at least partially stabilize the portion of the subterranean formation, e.g., by reducing the propensity of shale present in the portion of the subterranean formation to swell or migrate.

Optionally the treatment fluids of the present invention may comprise polyols to aid in thinning or thickening the solution depending on the desired properties. Suitable polyols are those aliphatic alcohols containing two or more hydroxy groups. It is preferred that the polyol be at least partially water-miscible. Examples of suitable polyols that may be used in the aqueous-based treatment fluids of this invention include, but are not limited to, water-soluble diols such as ethylene glycols, propylene glycols, polyethylene glycols, polypropylene glycols, diethylene glycols, triethylene glycols, dipropylene glycols and tripropylene glycols, any combination of these glycols, their derivatives, and reaction products formed by reacting ethylene and propylene oxide or polyethylene glycols and polypropylene glycols with active hydrogen base compounds (e.g., polyalcohols, polycarboxylic acids, polyamines, or polyphenols). The polyglycols of ethylene generally are thought to be water-miscible at molecular weights at least as high as 20,000. The polyglycols of propylene, although giving slightly better grinding efficiency than the ethylene glycols, are thought to be water-miscible up to molecular weights of only about 1,000. Other glycols possibly contemplated include neopentyl glycol, pentanediols, butanediols, and such unsaturated diols as butyne diols and butene diols. In addition to the diols, the triol, glycerol, and such derivatives as ethylene or propylene oxide adducts may be used. Other higher polyols may include pentaerythritol. Another class of polyhydroxy alcohols contemplated is the sugar alcohols. The sugar alcohols are obtained by reduction of carbohydrates and differ greatly from the above-mentioned polyols. Any combination or derivative of these are suitable as well.

The choice of polyol to be used is largely dependent on the desired density of the fluid. Other factors to consider include thermal conductivity. For higher density fluids (e.g., 10.5 ppg or higher), a higher density polyol may be preferred, for instance, triethylene glycol or glycerol may be desirable in some instances. For lower density applications, ethylene or propylene glycol may be used. In some instances, more salt may be necessary to adequately weight the fluid to the desired density. In certain embodiments, the amount of polyol that should be used may be from about 40% to about 99% by volume of the treatment fluid.

CROSS REFERENCE TO RELATED APPLICATIONS

The treatment fluids of the present invention may comprise bridging agents. Preferably, when used, the bridging agents are either non-degradable, self-degrading or degradable in a suitable clean-up solution (e.g., a mutual solvent, water, an acid solution, etc.). Examples of bridging agents suitable for use in the methods of the current invention include, but are not necessarily limited to, magnesium citrate, calcium citrate, calcium succinate, calcium maleate, calcium tartrate, magnesium tartrate, bismuth citrate, calcium carbonate, sodium chloride and other salts, and the hydrates thereof. Examples of degradable bridging agents may include, but are not necessarily limited to, bridging agents comprising degradable materials such as degradable polymers. Specific examples of suitable degradable polymers include, but are not necessarily limited to, polysaccharides such as dextrans or celluloses; chitins; chitosans; proteins; orthoesters; aliphatic polyesters; poly(lactides); poly(glycolides); poly($\epsilon$-caprolactones); poly(hydroxybutyrates); poly(anhydrides); aliphatic polycarbonates; poly(orthoesters); poly(amino acids); poly(ethylene oxides); and polyphosphazenes. Any combination or derivative of these are suitable as well. One suitable commercially available lightweight particulate is a product known as "BIO VERT" available from Halliburton Energy Services, located in Duncan, Okla. BIO VERT is a polymer material comprising 90-100% polylactide and having a specificgravity of about 1.25.

When choosing a particular bridging agent to use, one should be aware of the performance of that bridging agent at the temperature range of the application. The bridging agents utilized may be generally present in the drilling fluid compositions in an amount in the range of from about 1% to about 40% by weight thereof, more preferably from about 5% to about 25%. Generally, the bridging agents may have a particle size in the range of from about 1 micron to about 600 microns. Preferably, the bridging particle size is in the range of from about 1 to about 200 microns but may vary from formation to formation. The particle size used is determined by the pore throat size of the formation.

The treatment fluids of the present invention also may comprise suitable fluid loss control agents. Any fluid loss agent that is compatible with the treatment fluids of the present invention is suitable for use in the present invention. Examples include, but are not limited to, microgels, starches, silica flour, gas bubbles (energized fluid or foam), benzoic acid, soaps, resin particulates, relative permeability modifiers, degradable gel particulates, diesel dispersed in fluid, and other immiscible fluids. Another example of a suitable fluid loss control additive is one that comprises a degradable polymer, such as those listed above. If included, a fluid loss additive should be added to a treatment fluid of the present invention in an amount necessary to give the desired fluid loss control. In some embodiments, a fluid loss additive may be included in an amount of about 5 to about 2000 lbs/Mgal of the treatment fluid. In some embodiments, the fluid loss additive may be included in an amount from about 10 to about 50 lbs/Mgal of the treatment fluid. For some liquid additives like diesel, these may be included in an amount from about 0.01% to about 20% by volume; in some embodiments, these may be included in an amount from about 1.0% to about 10% by volume.

In accordance with embodiments of the present invention, the treatment fluids of the present invention that comprise a transient polymer network may be used in a variety of suitable applications. By way of example, the treatment fluids may be used in subterranean operations, including, but not limited to, drilling operations, underbalanced drilling operations, overbalanced drilling operations, acidizing operations, gravel-packing operations, fracturing operations, completion operations, and cementing operations. Among other things, the treatment fluids may be used in subterranean fluids as drilling fluids, drill-in fluids, cement fluids, spacer fluids, pills, and the like.

In one embodiment, the present invention provides a method comprising: providing a treatment fluid comprising an aqueous base fluid and a transient polymer network, and placing the treatment fluid in a subterranean formation.

In one embodiment, the present invention provides a method comprising: providing a drilling fluid comprising an aqueous base fluid and a transient polymer network; and using the drilling fluid to drill at least a portion of a well bore in a subterranean formation. Embodiments of the present invention may include circulating the drilling fluid in a well bore while drilling In one embodiment, the present invention provides a subterranean treatment fluid comprising: an aqueous-base fluid and a transient polymer network.

An example method of the present invention generally may comprise providing a treatment fluid comprising a transient polymer network; and introducing the treatment fluid into the subterranean formation having a bottom hole temperature of about 275° F. or more.

In certain embodiments, as shown in the example below, the method further may comprise allowing the transient polymer network to maintain thermal stability and gel strength at temperatures up to about 350° F.

In some embodiments, where the treatment fluids of the present invention are used in a fracturing operation, a portion of the subterranean formation may be contacted with the treatment fluid so as to create or enhance one or more fractures therein, the treatment fluid comprising a transient polymer network. The desired formulation of the treatment fluids would be determined to obtain desired rheology.

In other embodiments, wherein the treatment fluids of the present invention are used in a frac pack operation, a portion of the subterranean formation may be contacted with the treatment fluids so as to so as to create or enhance one or more fractures therein, the treatment fluids comprising an aqueous base fluid, a transient polymer network, and a proppant particulate (e.g., gravel).

In other embodiments, the treatment fluids of the present invention may be placed into the well bore as a pill either prior to or after the stabilization of unconsolidated formation particulates in a section of the subterranean formation penetrated by the well bore. The desired volume of the treatment fluids of the present invention introduced into the well bore is based, among other things, on several properties of the section to be treated, such as depth and volume of the section, as well other physical properties of material in the section. The treatment fluid may reduce fluid loss into the formation from other fluids (e.g., carrier fluids or completion fluids) that may be introduced into the well bore subsequent to the treatment fluid and reduce the subsequent problems associated with water flowing into the well bore from the subterranean formation.

In another embodiment of the present invention, the treatment fluids may be placed into the subterranean formation as a viscosified pill during an underbalanced drilling operation. An underbalanced drilling operation may be referred to as a managed pressure drilling operation by some skilled in the art. Influxes from the formation may be experienced during an underbalanced drilling operation. Nitrogen may be used to combat this. The treatment fluids may be recovered by pumping gas into the formation to lift the pill out of the subterranean formation.

Another example of a method of the present invention comprises using the treatment fluids prior to a cementing operation. In one embodiment, such a method may comprise: providing a treatment fluid comprising an aqueous base fluid and a transient polymer network; introducing the treatment fluid into a subterranean formation; allowing the treatment fluid to suspend and carry particulates from the well bore to the surface of a well site located above the subterranean formation; introducing a cement composition into the subterranean formation; and allowing the cement to set in the well bore. The set cement should have a tighter bond with the formation as a result.

To facilitate a better understanding of the present invention, the following representative examples of certain aspects of some embodiments are given. In no way should the following examples be read to limit, or define, the scope of the invention.

Examples

The following examples are submitted for the purpose of demonstrating the performance characteristics of treatment fluids comprising the transient polymer networks of the present invention. These tests were conducted substantially in accordance with the test methods described in ANSI/API RP 13B-2: Recommended Practice for Field Testing Oil-based Drilling Fluids (as noted above).

Samples of treatment fluids comprising transient polymer networks were hot rolled at various temperatures for 16 hours. The rheological properties of the resulting fluids are given below in Table 1.

TABLE 1

Rheological Properties of Treatment Fluids

| FANN ® 35 dial readings | 16 Hot Roll Temp, ° F. | | | | | | |
|---|---|---|---|---|---|---|---|
| | 150 | 250 | 275 | 300 | 325 | 350 | 400 |
| 600 rpm | 92 | 97 | 100 | 99 | 105 | 106 | 95 |
| 300 rpm | 62 | 64 | 67 | 67 | 70 | 72 | 66 |
| 200 rpm | 48 | 47 | 51 | 52 | 54 | 55 | 50 |
| 100 rpm | 32 | 31 | 33 | 34 | 35 | 36 | 33 |
| 6 rpm | 9 | 9 | 8 | 9 | 9 | 10 | 8 |
| 3 rpm | 8 | 7 | 8 | 8 | 8 | 8 | 8 |
| PV | 30 | 33 | 33 | 32 | 35 | 34 | 29 |
| YP | 32 | 31 | 34 | 35 | 35 | 38 | 37 |
| Spurt, ml | — | 1.6 | 2.1 | 1.8 | 2.2 | 2.8 | 5.2 |
| Loss, ml | — | 5.6 | 6.6 | 7.1 | 8.6 | 11.4 | 19.0 |

Upon review of the above data, one of ordinary skill in the art should understand that the treatment fluids comprising transient polymer networks in accordance with the present invention demonstrate improved rheological properties. In particular, the treatment fluids comprising transient polymer networks according to the present invention demonstrate improved suspension characteristics, including good low-shear viscosity and YP, while maintaining the PV as low as possible.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method comprising:
providing a treatment fluid comprising an aqueous base fluid and a transient polymer network that comprises microdomains that comprise a network forming polymer, wherein the network forming polymer comprises a hydrophilic polymer backbone having a plurality of hydrophobic modifications of about C1 to about C24, and wherein the network forming polymer has a molecular weight of about 500,000 to about 10,000,000, wherein a concentration of the network forming polymer in the treatment fluid is greater than a critical overlap concentration, and wherein the treatment fluid either (i) does not comprise a surfactant or (ii) further comprises the surfactant at less than a concentration that forms solubilizing micelles; and
placing the treatment fluid in a subterranean formation having a bottom hole temperature of about 275° F. to about 400° F.

2. The method of claim 1 wherein the aqueous base fluid comprises a fluid selected from the group consisting of fresh water, salt water, brine, seawater, and any combination thereof.

3. The method of claim 1 wherein the aqueous base fluid is present in an amount in the range of about 20% to about 99% of the treatment fluid.

4. The method of claim 1 wherein the transient polymer network comprises a monomer or polymer selected from the group consisting of a monomer or polymer that comprises a unit based on an acrylamide, a vinyl alcohol, a vinylpyrrolidone, a vinylpyridine, an acrylate, a polyacrylamide, a polyvinyl alcohol, a polyvinylpyrrolidone, a polyvinylpyridine, a polyacrylate, a polybutylene succinate, a polybutylene succinateco-adipate, a polyhydroxybutyrate-valerate, a polyhydroxybutyrate-covalerate, a polycaprolactone, a polyester amide, a polyethylene terephthalate, a sulfonated polyethylene terephthalate, a polyethylene oxide, a polyethylene, a polypropylene, an aliphatic aromatic copolyester, a polyacrylic acid, a polysaccharide, a dextran, a cellulose, a chitin, a chitosan, a protein, an aliphatic polyester, a polylactic acid, a poly(glycolide), a poly(ε-caprolactone), a poly(hydroxy ester ether), a poly(hydroxybutyrate), a poly(anhydride), a polycarbonate, a poly(orthoester), a poly(amino acid), a poly (ethylene oxide), a poly(propylene oxide), a poly(phosphazene), a polyester amide, a polyamide, a polystyrene, any derivative thereof, any copolymer thereof, a homopolymer thereof, a terpolymer thereof, and any combination thereof.

5. The method of claim 1 wherein the transient polymer network comprises a network forming polymer in an amount of about 0.01% to about 15% by weight of the treatment fluid.

6. The method of claim 1 wherein the treatment fluid has a yield point value of from about 5 to about 100 and a plastic viscosity value of from about 5 to about 50.

7. The method of claim 1 wherein the transient polymer network maintains structure in a stress range exceeding about 12 Pa.

8. The method of claim 1 wherein the treatment fluid comprises additional additives selected from the group consisting of a surfactant, a bridging agent, a polyol, a fluid loss control agent, a pH-adjusting agent, a pH buffer, a shale stabilizer, and any combination thereof.

9. The method of claim 1 wherein the treatment fluid comprises a surfactant selected from the group consisting of an anionic surfactant, a neutral surfactant, a cationic surfactant, a zwitterionic surfactant, and any combination thereof.

10. The method of claim 1 wherein placing the treatment fluid in a subterranean formation involves a subterranean operation selected from the group consisting of a drilling operation, an underbalanced drilling operation, an overbalanced drilling operation, an acidizing operation, a gravel-packing operation, a fracturing operation, a frac-pack operation, a completion operation, and a cementing operation.

11. The method of claim 1 wherein the treatment fluid is used as a spacer or a pill.

12. The method of claim 1 wherein the treatment fluid has a plastic viscosity of at least 30 at a temperature of 350° F. and below.

13. A method comprising:
providing a drilling fluid comprising an aqueous base fluid and a transient polymer network that reversibly breaks with shear, the transient polymer network capable of maintaining gel strength at a temperature of about 275° F. to about 400° F., wherein the transient polymer network that comprises microdomains that comprise a network forming polymer that comprises a hydrophilic polymer backbone having a plurality of hydrophobic modifications of about C1 to about C24, and wherein the network forming polymer has a molecular weight of about 500,000 to about 10,000,000, wherein a concentration of the network forming polymer in the treatment fluid is greater than a critical overlap concentration, and wherein the treatment fluid either (i) does not comprise a surfactant or (ii) further comprises the surfactant at less than a concentration that forms solubilizing micelles; and
using the drilling fluid to drill at least a portion of a well bore in a subterranean formation.

14. The method of claim 13 wherein the transient polymer network comprises a monomer or polymer selected from the group consisting of a monomer or polymer that comprises a unit based on an acrylamide, a vinyl alcohol, a vinylpyrrolidone, a vinylpyridine, an acrylate, a polyacrylamide, a polyvinyl alcohol, a polyvinylpyrrolidone, a polyvinylpyridine, a polyacrylate, a polybutylene succinate, a polybutylene succinateco-adipate, a polyhydroxybutyrate-valerate, a polyhydroxybutyrate-covalerate, a polycaprolactone, a polyester amide, a polyethylene terephthalate, a sulfonated polyethylene terephthalate, a polyethylene oxide, a polyethylene, a polypropylene, an aliphatic aromatic copolyester, a polyacrylic acid, a polysaccharide, a dextran, a cellulose, a chitin, a chitosan, a protein, an aliphatic polyester, a polylactic acid, a poly(glycolide), a poly($\epsilon$-caprolactone), a poly(hydroxy ester ether), a poly(hydroxybutyrate), a poly(anhydride), a polycarbonate, a poly(orthoester), a poly(amino acid), a poly(ethylene oxide), a poly(propylene oxide), a poly(phosphazene), a polyester amide, a polyamide, a polystyrene, any derivative thereof, any copolymer thereof, a homopolymer thereof, a terpolymer thereof, and any combination thereof.

15. The method of claim 13 wherein the transient polymer network comprises a network forming polymer in an amount of about 0.01% to about 15% by weight of the treatment fluid.

16. The method of claim 13 wherein the drilling fluid has a yield point value of from about 5 to about 100 and a plastic viscosity value of from about 5 to about 50.

17. The method of claim 13 wherein the transient polymer network maintains structure in a stress range exceeding about 12 Pa.

18. The method of claim 13 wherein the drilling fluid comprises a surfactant selected from the group consisting of an anionic surfactant, a neutral surfactant, a cationic surfactant, a zwitterionic surfactant, and any combination thereof.

19. The method of claim 13 wherein the drilling fluid has a plastic viscosity of at least 30 at a temperature of 350° F. and below.

20. The method of claim 13 wherein the drilling fluid is circulated in the well bore.

21. A method comprising:
providing a treatment fluid comprising an aqueous base fluid and a transient polymer network that comprises a network forming polymer having a hydrophobic modification of about C1 to about C24, and wherein the network forming polymer has a molecular weight of about 500,000 to about 10,000,000, wherein a concentration of the network forming polymer in the treatment fluid is greater than a critical overlap concentration, and wherein the treatment fluid either (i) does not comprise a surfactant or (ii) further comprises the surfactant at less than a concentration that forms solubilizing micelles;
introducing the treatment fluid into a subterranean formation having a bottom hole temperature of about 275° F. to about 400° F.;
allowing the treatment fluid to suspend and carry particulates from the well bore to the surface of a well site located above the subterranean formation;
introducing a cement composition into the subterranean formation; and
allowing the cement to set in the well bore.

22. A method comprising:
providing a treatment fluid comprising an aqueous base fluid and a transient polymer network that comprises a network forming polymer comprising a hydrophobic modification of about C1 to about C24 and a unit based on at least one selected from the group consisting of a vinyl alcohol, a vinylpyrrolidone, a vinylpyridine, a polyvinyl alcohol, a polyvinylpyrrolidone, a polyvinylpyridine, a polybutylene succinate, a polybutylene succinateco-adipate, a polyhydroxybutyrate-valerate, a polyhydroxybutyrate-covalerate, a polycaprolactone, a polyester amide, a polyethylene terephthalate, a sulfonated polyethylene terephthalate, a polyethylene, a polypropylene, an aliphatic aromatic copolyester, a polysaccharide, a dextran, a chitin, a chitosan, a protein, an aliphatic polyester, a polylactic acid, a poly(glycolide), a poly(hydroxy ester ether), a poly(hydroxybutyrate), a poly(anhydride), a polycarbonate, a poly(orthoester), a poly(amino acid), a poly(phosphazene), a polyester amide, a polyamide, a polystyrene, any derivative thereof, any copolymer thereof, any homopolymer thereof, any terpolymer thereof, and any combination thereof, and wherein the network forming polymer has a molecular weight of about 500,000 to about 10,000,000, wherein a concentration of the network forming polymer in the treatment fluid is greater than a critical overlap concentration, and wherein the treatment fluid either (i) does not comprise a surfactant or (ii) further comprises the surfactant at less than a concentration that forms solubilizing micelles;
introducing the treatment fluid into a subterranean formation;
allowing the treatment fluid to suspend and carry particulates from the well bore to the surface of a well site located above the subterranean formation;
introducing a cement composition into the subterranean formation; and
allowing the cement to set in the well bore.

\* \* \* \* \*